Oct. 25, 1938.  M. A. LAABS  2,133,994
OPHTHALMIC LENS
Filed Aug. 22, 1935  2 Sheets-Sheet 1
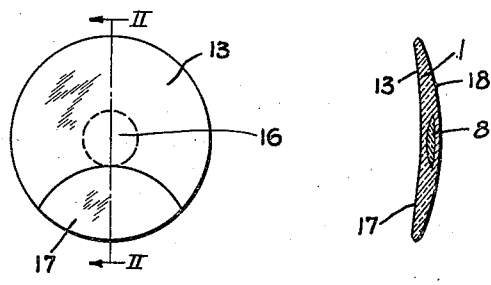
FIG. I  FIG. II
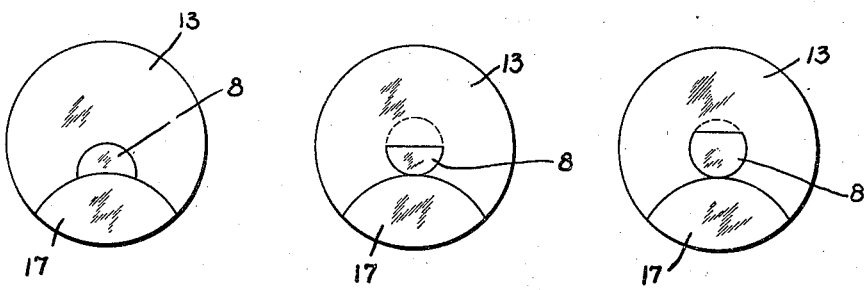
FIG. III  FIG. IV  FIG. V
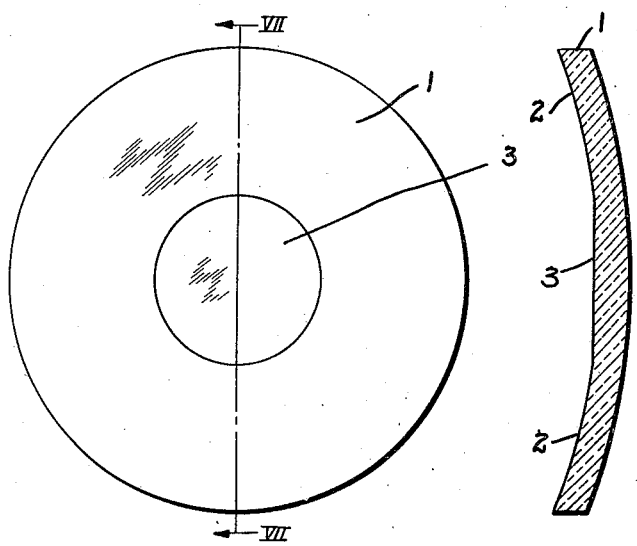
FIG. VI  FIG. VII
INVENTOR
MAX A. LAABS
BY Harry H. Styll
ATTORNEY Oct. 25, 1938.  M. A. LAABS  2,133,994
OPHTHALMIC LENS
Filed Aug. 22, 1935  2 Sheets-Sheet 2
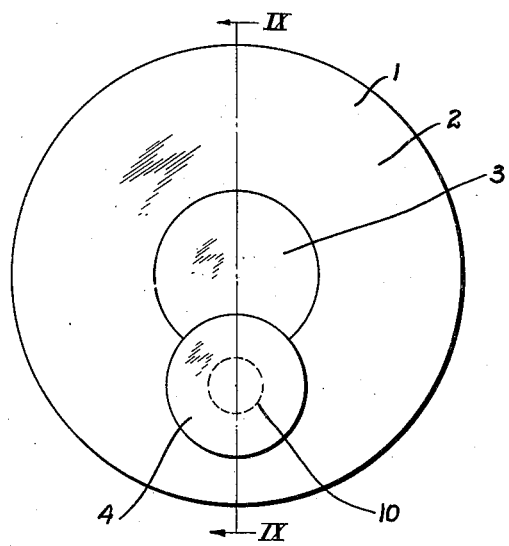
FIG. VIII
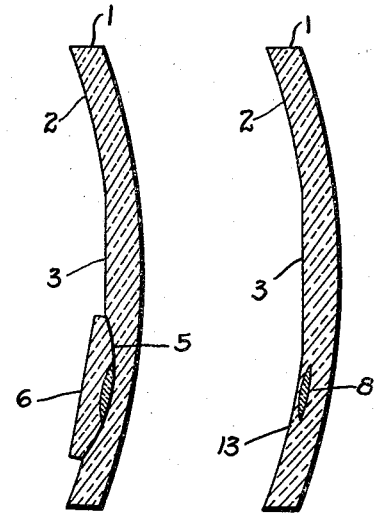
FIG. IX    FIG. X
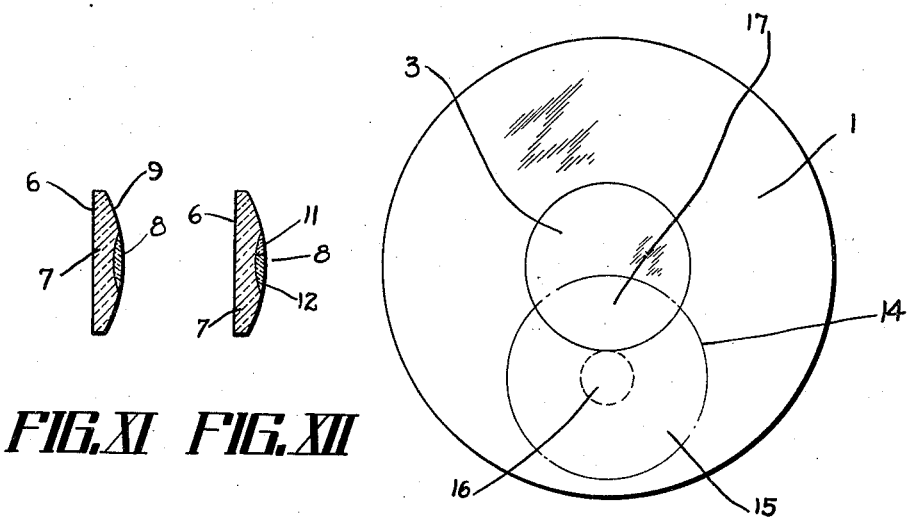
FIG. XI    FIG. XII
FIG. XIII
INVENTOR
MAX A. LAABS
BY
Harry H. Styll
ATTORNEY Patented Oct. 25, 1938

2,133,994

UNITED STATES PATENT OFFICE 2,133,994

OPHTHALMIC LENS

Max A. Laabs, Southbridge, Mass., assignor to American Optical Company, Southbridge, Mass., a voluntary association of Massachusetts Application August 22, 1935, Serial No. 37,348

4 Claims. (Cl. 88—54)

This invention relates to improvements in trifocal lenses and to an improved method of making the same.

A principal object of the invention is to provide an improved composite one piece and fused form of lens wherein the fused portion of the lens is covered and protected from injury during the later finishing operations required to produce the finished lens.

Another object of the invention is to provide an easier and more economical method for producing a combined one piece and fused lens of this character.

Another object of the invention is to provide a trifocal lens having three fields with only one change in curvature.

Another object of the invention is to provide a trifocal lens wherein the softer lens medium of the fused portion is covered over and protected by the harder lens medium of the outer portion.

Other objects and advantages of the invention will become apparent from the following description taken in connection with the accompanying drawings. It is apparent that many changes in the details of construction and arrangement of parts and the steps of the process may be made without departing from the spirit of the invention as expressed in the accompanying claims. I, therefore, do not wish to be limited to the exact arrangements and details shown and described, as the preferred forms only are shown and described by way of illustration.

In the past, when composite one piece and fused trifocal lenses have been made, the softer lens material of the fused portion has been exposed, and it has, therefore, been difficult and expensive to finish the other fields of the lens without marring or destroying the fused field. In my invention the fused field is buried in and covered over by the material of the base or supporting lens, which has a harder lens material, and is thus protected during the final finishing operations. This makes a much easier job and a much more economical one to produce, and also prevents a large percentage of the wastage which was present in the manufacture of prior art trifocals.

Referring to the drawings:

Fig. I is a front view of the trifocal provided by the invention;

Fig. II is a cross-section on line II—II of Fig. I;

Fig. III is a front view of a modification;

Fig. IV is a front view of still another modification;

Fig. V is a front view of still a third modification;

Fig. VI is a front view of a one piece blank showing a stage in the process;

Fig. VII is a cross-section on line VII—VII of Fig. VI;

Fig. VIII is a front view of the blank showing the countersink with fused portion;

Fig. IX is a cross-section on line IX—IX of Fig. VIII;

Fig. X is a cross-section similar to Fig. IX showing the button portion finished to final curvature;

Fig. XI is a cross-section showing one form of the button;

Fig. XII is a cross-section showing another form of button; and

Fig. XIII is a front view of a finished blank indicating in dot and dash lines the finished lens to be cut thereupon.

Referring to the drawings, wherein like references indicate corresponding parts throughout, I first mold a dish shaped lens blank 1 to approximately the general shape required for the finished lens. On one face of the blank 1, I grind and finish the surfaces 2 and 3 to different curvatures as required by the finished lens, the curvature 2 being used for distance vision and the curvature 3 for near or reading vision. The operation of producing these surfaces 2 and 3 is that of the prior art ring tool method. Surfacing and grinding tools of ring form or of solid spherical form may be used, both forms of grinding being usual in the prior art.

I next grind and finish the countersink 4 on the surface side of the blank 1. As shown in Fig. VIII, it will be noted that the countersink 4 overlaps the inner surface 3 of the blank. These two surfaces may be related in any relationship desired for the finished lens. The bottom of the countersink 4 is a spherical lenticular surface.

I next make the button 6, Fig. XI to fit the countersink 4. In one form of my invention the button 6 has an outer portion 7 which is of the same index of refraction as the blank 1, and has an inner button portion 8 fused therein. This inner button portion 8 is of a different index of refraction from that of the blank 1.

I then finish the inner side of the button 6 to the surface 9 to fit the curvature 5 of the countersink 4, and then I fuse the button 6 in the countersink 4, with the surface 9 engaging the surface 5. If this type of button 6 is used, the button portion 8 will be circular in outline, as shown at 10 in Fig. VIII. If I desire to use a different shape of button portion 8, as shown in Figs. III, IV, and V, I make the button portion 8 in two parts, 11 and 12, Fig. XII. In this form of button the outer portion 6 is of the same index of refraction as the blank 1, and the upper portion 11 of the button 8 has the same index of refraction as the part 1, and the lower portion 12 of the button 8 is of different index of refraction. In this way I can obtain any of the shapes of the button or segment as shown in Figs. III, IV, and V.

It will be understood, then, that in my process I can obtain any of the shapes of the button 8 usual in fused lenses of the prior art.

After I have fused the button 6 into the countersink 4, I then grind off and finish the projecting portion of the button 6 to the surface 13, Fig. X, which, it will be understood, has now been imposed upon the original surface 2. The blank now will have the inner or central surface 3 as originally made, and the outer surface 13. The button 8 will be buried in the material of the blank 1, a portion thereof overlying the button 8.

It will be noted that while the projecting portion of the button 6 was being ground off, the inner button portion 8 was protected and was not touched by the grinding tool. This is due to the fact that the outer portion 7 of the button has the same index of refraction as the blank 1, and when they are fused together they merge so that there is really a portion of the same kind of material as the blank 1 overlying the inner button 8. This is also true in the case of the two part inner button 8, shown in Fig. XII, where the part 11 and the part 7 merge with the material of the blank 1.

After I have finished the blank as described above, and as shown in Fig. X, I next lay off the line of the finished lens to be cut from the blank as shown in Fig. X. This is indicated by the dot and dash line 14 in Fig. XIII.

Referring to Fig. XIII, it will be noted that if the lens portion is cut out of the blank 1 along the line 14, the portion 15 will give us the curvature for the distance field, the portion 16 will give us the field of the fused portion, which will be for intermediate distance, and the portion 17 of the original portion 3 will give us the field for the reading distance. It will be understood that the portion 17 is at the bottom of the finished lens.

After the blank has been cut along the line 14, I next grind the rear side 18, Fig. II, to a lenticular surface of the prescription power required to give the desired prescription powers in the three fields.

Referring to Figs. I and II, wherein the finished lens is shown, the portion 13 will represent the distance field, the portion 16 will represent the intermediate field or fused field, and the portion 17 will represent the reading field, which is integral with the distance field 13.

It will be understood, of course, that the relative positions of the fields may be changed, as well as their relative sizes and shapes. It will be noted by referring to Fig. II that the fused field 8 is entirely embedded in the material of the blank 1, and that the field 17 is integral with the blank 1.

It will be clear too that in producing the lens, after the button 6 has been fused in the countersink 4, the button portion 8 is thereafter protected during all the finishing operations of making the lens. By making the portion 8 embedded in the portion 1, the field 8 is protected against scratches. This is very important because the fusible lens material of the portion 8 is softer than the portion 1. This process, by protecting the portion 8, is much more economical and easier to perform than prior art processes of making trifocal lenses of this kind, and the percentage of waste is greatly reduced because the portion 8 is not damaged during the finishing operations.

From the foregoing it will be seen that I have provided economical means for carrying out all of the objects of the invention and obtaining its advantages.

Having described my invention, I claim:

1. A multifocal lens having an upper distance field, central intermediate field and a lower reading field, said distance field comprising a unitary piece of lens medium of a given index of refraction and having curved optical surfaces on the opposed sides thereof of such radii as to produce the power desired of said distance field, said intermediate field comprising a relatively small piece of lens medium of a different index of refraction having curved optical surfaces on its opposed sides and secured between the first piece of lens medium and another piece of lens medium of sensibly the same index of refraction, said first piece of lens medium and piece of lens medium of sensibly the same index of refraction each having an outer surface which is a continuation of the respective opposed surfaces on the first piece of lens medium and which, combined with the opposed surfaces on the piece of lens medium of a different index of refraction, produce the power desired in said intermediate field and said reading field being composed of a continuation of the first piece of lens medium and having a surface on one side thereof which is a continuation of the respective adjacent surface which extends over the distance and intermediate fields and having a curved surface on the opposed side thereof which is of a different radius than the respective adjacent surface on the said distance and intermediate fields and which intersects said adjacent surface at a point substantially aligned with the lower contour edge of the piece of lens medium of a different index of refraction, along a line substantially normal to and extending through the plane of the lens.

2. A blank for a multifocal lens having an upper distance field, a central intermediate field and a lower reading field, said blank comprising a piece of lens medium of a given index of refraction having a relatively small piece of lens medium of a different index of refraction and provided with curved optical surfaces on the opposed sides thereof secured to said first piece of lens medium with a piece of lens medium of substantially the same index of refraction as said first piece of lens medium overlying said relatively small piece of lens medium, said first piece of lens medium having two adjacent surfaces of different curvatures on one side thereof with one of said surfaces having a radius forming a controlling element of the finished focal power of the distance field and overlying said relatively small piece of glass of a different index of refraction and functioning cooperatively with the opposed curved surfaces on said piece of lens medium of a different index of refraction to produce the power desired in the finished intermediate field and being so arranged as to intersect the other adjacent surface of different curvature at a point substantially aligned with the lower contour edge of said relatively small piece of lens medium of a different index of refraction along the line substantially normal to and extending through the plane of the blank and said adjacent surface of different curvature being of such a radius as to provide a controlling factor of the finished power to which the reading field is to be formed, the radius of curvature of all of the optical surfaces provided on the lens medium of each of said different focal fields being such that a continuous optical surface may be formed on the opposite unfinished side of the blank and thereby introduce the final controlling factor of the resultant powers of the respective focal fields of the finished lens.

3. The method of forming a multifocal lens having an upper distance field, central intermediate field and a lower reading field, comprising embedding, in a piece of lens medium of a given index of refraction, a relatively small piece of lens medium of a different index of refraction which has curved optical surfaces on its opposed sides and the contour shape and size desired of the intermediate field, said small piece of lens medium being completely enclosed within said first piece of lens medium, forming, on one side of said composite pieces of lens medium, a surface curvature which will function as a controlling element of the resultant power desired of the distance field and as a controlling element of the resultant power desired of the intermediate field, forming a second adjacent surface on said side of the composite pieces of lens medium of a curvature different from the first curvature on said side and which will function as a controlling element of the resultant power desired of the reading field, and the said second surface being so formed as to intersect the first surface at a point substantially aligned with the lower contour edge of the relatively small piece of lens medium along a line substantially normal to and extending through the plane of the lens and forming a continuous optical surface on the opposite side of said composite pieces of lens medium of a curvature which when combined with said first formed surfaces completes the focal powers desired in the respective focal fields of the lens.

4. The method of forming a blank for a multifocal lens which is to have an upper distance field, central intermediate field and a lower reading field, comprising embedding, in a piece of lens medium of a given index of refraction, a relatively small piece of lens medium of a different index of refraction which has curved optical surfaces on its opposed sides and the contour shape and size desired of the intermediate field, said small piece of lens medium being completely enclosed within said first piece of lens medium, forming, on one side of said composite pieces of lens medium, a surface curvature which will function as a controlling element of the resultant power desired of the distance field and as a controlling element of the resultant power desired of the intermediate field, forming a second adjacent surface on said side of the composite pieces of lens medium of a curvature different from the first curvature on said side and which will function as a controlling element of the resultant power desired of the reading field, the said second surface being so formed as to intersect the first surface at a point substantially aligned with the lower contour edge of the relatively small piece of lens medium along a line substantially normal to and extending through the plane of the lens blank and leaving an unfinished surface on the opposite side of said blank.

MAX A. LAABS.